United States Patent [19]
Yasuda et al.

[11] Patent Number: 5,698,634
[45] Date of Patent: Dec. 16, 1997

[54] PROCESS FOR PREPARING BLOCK COPOLYMER OF MONOOLEFIN

[75] Inventors: Hajime Yasuda; Eiji Ihara, both of Hiroshima-ken, Japan

[73] Assignee: Mitsui Toatsu Chemicals, Inc., Tokyo, Japan

[21] Appl. No.: 683,208

[22] Filed: Jul. 18, 1996

Related U.S. Application Data

[63] Continuation of Ser. No. 267,747, Jul. 5, 1994, Pat. No. 5,563,219.

[30] Foreign Application Priority Data

Jul. 16, 1993 [JP] Japan ................................ 176422
Jul. 16, 1993 [JP] Japan ................................ 176423

[51] Int. Cl.$^6$ ............................... C08F 4/52; C08F 297/06
[52] U.S. Cl. .................... 525/269; 525/333.7; 525/415; 526/170; 526/172; 526/943
[58] Field of Search .................. 525/245, 269, 525/333.7, 415; 526/170, 172, 943

[56] References Cited

U.S. PATENT DOCUMENTS

| | | | |
|---|---|---|---|
| 4,668,773 | 5/1987 | Marks et al. | 534/15 |
| 5,132,369 | 7/1992 | Yasuda et al. | 525/247 |
| 5,218,064 | 6/1993 | Yasuda et al. | 576/160 |

FOREIGN PATENT DOCUMENTS

| | | |
|---|---|---|
| 442476 | 8/1991 | European Pat. Off. . |
| 0462588 | 12/1991 | European Pat. Off. . |
| WO86/05788 | 10/1986 | WIPO . |

OTHER PUBLICATIONS

H. Yasuda et al. (1992) Macromol. 25, 5115–6.

N.I. Sax et al., eds., Hawley's Condensed Chemical Dictionary, 11th Ed., Van Nostrand Reinhold, New York, 1987, p. 1224.

Grant & Mackh's Chemical Dictionary, 5th Ed., McGraw Hill, New York, 496–71.

Kirk–Othmer Concise Encyclopedia of Chemical Technology, Wiley (1985).

*Primary Examiner*—Mark Nagumo
*Attorney, Agent, or Firm*—Burns, Doane, Swecker & Mathis

[57] ABSTRACT

A process for preparing a block copolymer of an α-olefin and a vinyl compound is here disclosed which comprises the steps of polymerizing an olefin selected from ethylene and the α-olefin having 3 or more carbon atoms by the use of a divalent or a trivalent rare earth metal complex, and then polymerizing a vinyl compound, a vinylidene compound or a lactone. According to the process of the present invention, a polar group can be introduced into a polyolefin, whereby the characteristics of the polymer can be effectively improved.

9 Claims, No Drawings

PROCESS FOR PREPARING BLOCK COPOLYMER OF MONOOLEFIN

This application is a continuation of application Ser. No. 08/267,747, filed Jul. 5, 1994, now U.S. Pat. No. 5,563,219.

BACKGROUND OF THE INVENTION (a) Field of the Invention

The present invention relates to a process for preparing a block copolymer of a monoolefin and a vinyl compound, a vinylidene compound or a lactone. More specifically, it relates to a process for preparing the above-mentioned block copolymer in accordance with a living polymerization method by the use of a specific catalyst.

(b) Description of the Prior Art

In general, a polyolefin is poor in chemical reactivity and adhesive properties to another resin, is hardly dyed with a dye or a pigment, and has a large gas permeability.

In order to solve these problems, it has been carried out to graft-polymerize a monomer having a polar group to a polyolefin.

Alternatively, as another method, it has already been reported by the same inventors as in this application that by the use of a lanthanoide catalyst, methyl methacrylate or a lactone can be further block-copolymerized to a polymerization-active terminal at which ethylene is polymerized (Japanese Patent Application Laid-open No. 255116/1991 & which corresponds to U.S. Pat. Nos. 5,132,369 and 5,218,064). This publication discloses that according to the above method, the block copolymer of ethylene and the vinyl compound or the lactone can be prepared, but a block copolymer of an α-olefin having 3 or more carbon atoms and a vinyl compound or a lactone is not disclosed anywhere. The polymerization of ethylene is relatively simple, and a copolymer with ethylene can also easily be prepared. For example, the ethylene copolymer can easily be prepared even in accordance with a radical polymerization method. As random copolymers, copolymers of ethylene-acrylate, ethylene-vinyl acetate and the like have been industrially produced in large quantities. However, if the preparation of a copolymer by the use of an α-olefin of 3 or more carbon atoms such as propylene is intended in accordance with a similar procedure, the molecular weight of the obtained copolymer is low, and for this reason, it is very difficult to obtain the useful copolymer. Thus, any effective method has not been known. In the above-mentioned patent, the block copolymer of ethylene has been disclosed, but copolymer of an α-olefin having 3 or more carbon atoms is neither disclosed nor suggested anywhere.

The method disclosed in the above-identified Patent cannot polymerize an α-olefin having 3 or more carbon atoms, such as propylene, and therefore the method is not capable of obtaining a block copolymer of an α-olefin having 3 or more carbon atoms and a vinyl compound or a lactone.

SUMMARY OF THE INVENTION

The present inventors have intensively investigated into a process for preparing a block copolymer of a monoolefin, particularly an α-olefin having 3 or more carbon atoms and a vinyl compound, a vinylidene compound or a lactone which can solve the above-mentioned problems. In consequence, the present invention has been completed.

That is to say, a first aspect of the present invention is directed to a process for preparing a block copolymer of a monoolefin and a vinyl compound which comprises the steps of polymerizing an α-olefin having 3 or more carbon atoms by the use of a divalent or a trivalent rare earth metal complex, and then polymerizing a vinyl compound, a vinylidene compound or a lactone.

A second aspect of the present invention is directed to a process for preparing a block copolymer of a monoolefin which comprises the steps of polymerizing ethylene by the use of a divalent rare earth metal complex, and then polymerizing a vinyl compound, a vinylidene compound or a lactone.

DESCRIPTION OF THE PREFERRED EMBODIMENTS

A catalyst for use in the present invention is a divalent or a trivalent rare earth metal complex, and the complex is represented by the following formula (1) or (2) and it can be singly used.

wherein

Cp is a cyclopentadienyl residue;

$R^1$ is a substituent on the cyclopentadienyl group and it is an alkyl group or a silicon-containing hydrocarbon residue having 1 to 20 carbon atoms;

X is a divalent hydrocarbon residue or a silicon-containing hydrocarbon residue having 1 to 20 carbon atoms;

j is an integer of 1 to 5;

Ln is a trivalent rare earth metal selected from the group consisting of Y, Sc, La, Ce, Pr, Nd, Pm, Eu, Gd, Tb, Dy, Ho, Er, Tm, Sm, Yb and Lu;

$R^2$ is an alkyl group or a silicon-containing hydrocarbon residue having 1 to 12 carbon atoms;

a Donor is a compound selected from the group consisting of a ketone, an ester, an ether and an amine having 1 to 12 carbon atoms; and n is 0 or 1.

wherein

Cp is a substituted cyclopentadienyl residue;

$R^1$ is a substituent on the cyclopentadienyl group and it is an alkyl group or a silicon-containing hydrocarbon residue having 1 to 20 carbon atoms;

X is a divalent hydrocarbon residue or a silicon-containing hydrocarbon residue having 1 to 20 carbon atoms;

j is an integer of 1 to 5;

Ln is a divalent rare earth metal selected from the group consisting of Sm, Yb and Eu;

a Donor is a compound selected from the group consisting of a ketone, an ester, an ether and an amine having 1 to 12 carbon atoms; and m is an integer of from 0 to 2.

In the process of the present invention, among the above-mentioned catalysts, a divalent or a trivalent compound represented by the formula (3) or (4) can be preferably used.

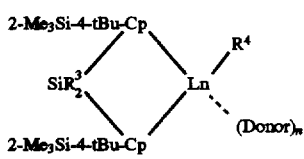

(3)

wherein

Cp is a substituted cyclopentadienyl residue;

Me₃Si is a trimethylsilyl group and tBu is a tertiary butyl group, and the cyclopentadienyl residue is substituted by these groups at the 2-position and the 4-position thereof, respectively;

R⁴ is a methyl group or a bistrimethylsilylmethyl group;

R³ is an alkyl group having 1 to 20 carbon atoms; Ln is a trivalent rare earth metal selected from the group consisting of Y, Sc, La, Ce, Pr, Nd, Pm, Eu, Gd, Tb, Dy, Ho, Er, Tm, Sm, Yb and Lu;

a Donor is a compound selected from the group consisting of a ketone, an ester, an ether and an amine having 1 to 12 carbon atoms; and n is 0 or 1.

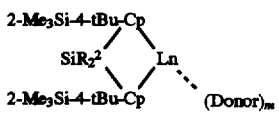

(4)

wherein

Cp is a substituted cyclopentadienyl residue; Me₃Si is a trimethylsilyl group and tBu is a tertiary butyl group, and the cyclopentadienyl residue is substituted by these groups at the 2-position and the 4-position thereof, respectively;

R² is an alkyl group having 1 to 20 carbon atoms;

Ln is a divalent rare earth metal selected from the group consisting of Sm, Yb and Eu;

a Donor is a compound selected from the group consisting of a ketone, an ester, an ether and an amine having 1 to 12 carbon atoms; and m is an integer of from 0 to 2.

In the process of the present invention, a monoolefin is first polymerized, and the polymerization of a vinyl compound, a vinylidene compound or a lactone is then carried out to obtain a block copolymer.

Examples of an α-olefin which can be used in the present invention include α-olefins having 3 to 20 carbon atoms. The α-olefins can be copolymerized with each other, or the α-olefin can be copolymerized with ethylene in an amount of 50 mol % or less of the α-olefin. Furthermore, after the polymerization of the α-olefin, the resultant polymer can be then polymerized with another α-olefin and/or ethylene. Typical examples of the α-olefin include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene and 4-methylpentene.

When the divalent rare earth metal complex of the formula (2), particularly the compound of the formula (4) is used as the catalyst, the polymerization can be efficiently carried out even by substituting ethylene for the α-olefin having 3 to 20 carbon atoms. In this case, the activity of the catalyst is higher as compared with a case where the trivalent rare earth metal complex is used, and what is better, a polyethylene having a relatively high molecular weight can be conveniently produced, so that a high-molecular weight block copolymer can be characteristically obtained.

In the present invention, the usable vinyl compound or vinylidene compound is a compound having an electron-attractive substituent Z represented by the formula (5)

$$H_2C=CR^5Z \qquad (5)$$

wherein

R⁵ is hydrogen or an alkyl group having 1 to 12 carbon atoms; and

Z is an electron-attractive residue.

Examples of the electron-attractive residue include esters residue, a halogen residue, a cyano residue and a phenyl group substituted by the cyano residue. These vinyl compound or vinylidene compound may be used singly or in combination. Particularly preferable examples of the compound represented by the formula (5) include esters of acrylic acid and esters of methacrylic acid, and typical examples thereof include methyl acrylate, ethyl acrylate, propyl acrylate, n-butyl acrylate, phenyl acrylate, methyl methacrylate, ethyl methacrylate, propyl methacrylate, n-butyl methacrylate and phenyl methacrylate.

Examples of the lactone include cyclic esters having 3 to 10 carbon atoms, and typical preferable examples thereof include propyllactone, valerolactone and caprolactone.

In the present invention, the polymerization can be achieved by a usual solvent polymerization method, a mass polymerization method or a gaseous phase polymerization method. In view of the fact that the polymerization is carried out in a living state, it is preferable that a polymerization temperature is relatively low. The polymerization temperature is usually in the range of −100° to 100° C., preferably −20° to 40° C. No particular restriction is put on a polymerization pressure, and it is in the range of from atmospheric pressure to 50 kgf/cm² (kilogram-force per square centimeter). The above polymerization conditions can be applied to the various block copolymerizations, and they can be optionally changed in the above ranges.

According to the practice of the process of the present invention, a block copolymer of an α-olefin can be obtained, and so the present invention is very valuable from an industrial viewpoint. Furthermore, when a divalent complex is used, the block copolymer in which a polyethylene moiety has a large molecular weight can be obtained, which means that the present invention also has an industrially large value.

Now, the present invention will be described in more detail with reference to examples, but the scope of the present invention should not be limited to these examples.

EXAMPLE 1

0.3 mol of t-butyl bromide was added dropwise at 0° C. to a tetrahydrofuran (THF) solution containing 0.3 mol of cyclopentadienyl sodium salt. After reaction at the same temperature for 2 hours, the reaction was further continued at 20° C. for 18 hours. Next, the reaction product was washed with aqueous hydrochloric acid, neutralized, dried, and then distilled to obtain 11 g of a colorless liquid t-butylcyclopentadiene. This t-butylcyclopentadiene was then reacted with an equimolar amount of n-butyl lithium to obtain a lithium salt (90 mmols). Afterward, 5.8 g of a THF solution of dichlorodimethylsilane was added dropwise at −78° C. to a THF solution of this lithium salt, followed by reaction at 20° C. for 24 hours. THF was distilled off from the reaction solution, and the resultant residue was extracted with heptane and a dissolved portion was then concentrated to obtain 12.6 g of a yellow liquid. Next, 84 mmols of n-butyl lithium was added dropwise at −78° C. to the THF solution of this yellow liquid, and reaction was then carried out at 0° C. for 6 hours. The THF solution of 9.1 g of trimethylsilane chloride was added thereto at −78° C., and reaction was then carried out at 20° C. for 24 hours. THF was distilled off from the reaction solution, and the resultant residue was extracted with heptane, and then filtered, and a dissolved portion was then concentrated to obtain 16.6 g of a light yellow liquid. Next, this liquid was reacted with 4.5 g of potassium hydride in decalin under a nitrogen atmosphere at 160° C. for 2 hours. From the reaction product, a yellow precipitate was separated, dried, dissolved in THF, and then filtered to remove excess potassium hydride which was the insoluble material, and the resultant filtrate was concentrated to obtain a yellow solid. This solid was washed with heptane, and then dried to obtain 14.4 g of a yellow solid. According to an NMR analysis, it was confirmed that the thus obtained solid was a potassium salt of dimethylsilylenebis(2-trimethylsilyl-4-t-butylcyclopentadiene).

Afterward, 1.5 g (3 mmols) of this potassium salt was dissolved in 30 ml of THF, and an equimolar amount of a THF solution of samarium diiodide was added dropwise thereto under a nitrogen atmosphere at 20° C. After reaction for 24 hours, the solution was concentrated to about 15 ml, followed by filtration. Next, the resultant filtrate was added to hexane to precipitate a violet solid, and this solid was then collected by filtration to obtain 1.1 g of dimethylsilylenebis(2-trimethylsilyl-4-t-butylcyclopentadiene)samarium(II) THF complex $(Me_2Si(2-Me_3Si-4-tBu-C_5H_2)_2Sm(THF)_2)$. This product could scarcely be identified by NMR, and so it was changed to a trivalent complex by the Am. Recknagel et al's method [Angew. Chem., 103, p. 720 (1991)] and measurement was then made by NMR, whereby it was confirmed that the product was the desired compound.

In a 100 ml flask were placed 60 ml of toluene and 1 mmol of a divalent samarium catalyst represented by the formula $Me_2Si(2-Me_3Si-4-tBu-C_5H_2)_2Sm(THF)_2$ at 25° C. under an argon gas stream, and 2.5 g of 1-pentene was then added thereto with stirring. After polymerization was carried out for 6 hours at 25° C., a part of the solution was taken out and 40 mmol of methyl methacrylate was further added, and the polymerization was further continued for 2 hours. After the reaction, a small amount of methanol was added thereto for deactivation. The resultant polymer was washed with methanol, and then dried. Before and after the addition of methyl methacrylate, molecular weights of the polymers were measured by a gel permeation chromatography. As a result, it was apparent that the molecular weight of the polymer before the addition of methyl methacrylate was 25,000, but that of the finally obtained polymer was 900,000, whereby it could be confirmed that the polymerization successively proceeded. Moreover, before and after the addition of methyl methacrylate, ratios of weight-average molecular weights to number-average molecular weights were 1.3 and 1.6, respectively, which meant that these molecular weights were very close to each other. According to an infrared absorption spectrum, it was apparent that the polymer before the addition of methyl methacrylate was poly(1-pentene), and it could be confirmed that polymethyl methacrylate was present in the finally obtained polymer and so a block copolymer was obtained. The yield of the polymer was 7.42 g per g of the samarium catalyst.

EXAMPLE 2

The same procedure as in Example 1 was carried out except that methyl methacrylate was replaced with caprolactone, and as a result, a block copolymer having a number-average molecular weight of 180,000 was obtained. Furthermore, a ratio of a weight-average molecular weight to the number-average molecular weight was 1.5, which meant that these molecular weights were very close to each other. According to an infrared absorption spectrum, the presence of polycaprolactone was confirmed, and so it could be confirmed that a block copolymer was obtained. The yield of the polymer was 4.2 g per g of a samarium catalyst.

EXAMPLE 3

As a catalyst, $Me_2Si(2-Me_3Si-4-tBu-C_5H_2)_2YCH(SiMe_3)_2$ in which a central metal was yttrium was synthesized in a manner described in Example 1, and polymerization was then done by the same procedure as in Example 1 except that this catalyst was used. Consequently, a polymer before the addition of methyl methacrylate had a number-average molecular weight of 160,000, but a finally obtained polymer had that of 400,000, whereby it could be confirmed that the polymerization successively proceeded. Furthermore, before and after the addition of methyl methacrylate, ratios of weight-average molecular weights to number-average molecular weights were 1.4 and 1.7, respectively, which meant that these molecular weights were very close to each other. According to an infrared absorption spectrum, it was apparent that the polymer before the addition of methyl methacrylate was poly(1-pentene), and it could be confirmed that polymethyl methacrylate was present in the finally obtained polymer and so a block copolymer was obtained. The yield of the polymer was 1.45 g per g of the yttrium catalyst.

EXAMPLE 4

The same procedure as in Example 3 was carried out except that methyl methacrylate was replaced with caprolactone, and as a result, a block copolymer having a number-average molecular weight of 210,000 was obtained. Furthermore, a ratio of a weight-average molecular weight to the number-average molecular weight was 1.7, which meant that these molecular weights were very close to each other. According to an infrared absorption spectrum, the presence of polycaprolactone was confirmed, and so it could be confirmed that a block copolymer was obtained. The yield of the polymer was 1.32 g per g of a yttrium catalyst.

EXAMPLE 5

In a 100 ml flask were placed 20 ml of toluene and 0.02 mmol of a divalent samarium catalyst represented by the formula $Me_2Si(2-Me_3Si-4-tBu-C_5H_2)_2Sm(THF)_2$ at 25° C. under an argon gas stream, and ethylene was then added thereto with stirring. After polymerization was carried out for 2 hours at 25° C., the flask was purged with argon. Afterward, a part of the resultant precipitate was taken out and 10 mmol of methyl methacrylate was further added, and the polymerization was additionally continued for 2 hours. After the reaction, a small amount of methanol was added thereto for deactivation. The resultant polymer was washed with methanol, and then dried. Before and after the addition of methyl methacrylate, molecular weights of the polymers were measured by a gel permeation chromatography. As a result, it was apparent that a number-average molecular weight of the polymer before the addition of methyl methacrylate was 180,000, but that of the finally obtained polymer was 300,000, whereby it could be confirmed that the polymerization successively proceeded. Furthermore, before and after the addition of methyl methacrylate, ratios of weight-average molecular weights to number-average molecular weights were 1.6 and 1.5, respectively, which meant that these molecular weights were very close to each other. According to an infrared absorption spectrum, it was apparent that the polymer before the addition of methyl methacrylate was polyethylene, and it could be confirmed that polymethyl methacrylate was present in the finally obtained polymer and so a block copolymer was obtained. The yield of the polymer was 8.25 g per g of the samarium catalyst.

EXAMPLE 6

The same procedure as in Example 5 was carried out except that methyl methacrylate was replaced with caprolactone, and as a result, a block copolymer having a number-average molecular weight of 200,000 was obtained. Furthermore, a ratio of a weight-average molecular weight to the number-average molecular weight was 1.6. According to an infrared absorption spectrum, it could be confirmed that a polycaprolactone was copolymerized. The yield of the polymer was 6.13 g per g of a samarium catalyst.

What is claimed is:

1. A process for preparing a block copolymer of an α-olefin which comprises polymerizing an α-olefin having 3 or more carbon atoms by the use of a trivalent rare earth metal complex, and then polymerizing a vinyl compound or a lactone to said α-olefin polymer wherein the trivalent rare earth metal complex is a compound represented by the following formula (3)

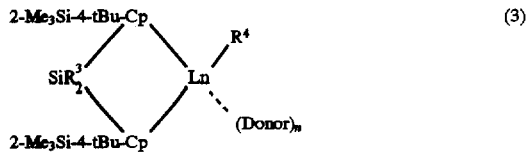

wherein

Cp is a substituted cyclopentadienyl residue;

$Me^3Si$ is a trimethylsilyl group and tBu is a tertiary butyl group, and the cyclopentadienyl residue is substituted by these groups at the 2-position and the 4-position thereof, respectively;

$R^4$ is a methyl group or a bistrimethylsilylmethyl group;

$R^3$ is an alkyl group having 1 to 20 carbon atoms;

Ln is a trivalent rare earth meal selected from the group consisting of Y, Sc, La, Ce, Pt, Nd, Pm, Eu, Gd, Tb, Dy, Ho, Er, Tm, Sin, Yb and Lu;

Donor is a compound selected from the group consisting of a ketone, an ester, an ether and amine having 1 to 12 carbon atoms; and n is 0 or 1.

2. The process according to claim 1 wherein the α-olefin having 3 or more carbon atoms is an α-olefin having 3 to 20 carbon atoms.

3. The process according to claim 2, wherein the vinyl compound is at least one compound represented by the formula $$H_2C=CR^5Z$$

wherein $R^5$ is hydrogen or an alkyl group having 1 to 12 carbon atoms; and

Z is an electron-attractive residue.

4. The process according to claim 1, wherein the vinyl compound is an ester of an unsaturated carboxylic acid.

5. The process according to claim 1, wherein the vinyl compound is a vinylidene compound.

6. The process according to claim 1 wherein the vinyl compound is at least one compound represented by the formula $H_2C=CR^5Z$ wherein $R^5$ is hydrogen or an alkyl group having 1 to 12 carbon atoms; and Z is an electron-attractive residue.

7. The process according to claim 1 wherein the vinyl compound is an ester of an unsaturated carboxylic acid.

8. The process according to claim 1, wherein a lactone is polymerized to said α-olefin polymer and the lactone is a cyclic ester having 3 to 10 carbon atoms.

9. The process according to claim 8, wherein the lactone is propyllactone, valerolactone and caprolactone.

* * * * *